(12) United States Patent
Rison

(10) Patent No.: US 8,238,369 B2
(45) Date of Patent: Aug. 7, 2012

(54) COEXISTENCE OF DATA STREAMS

(75) Inventor: Mark Gorthorn Rison, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 404 days.

(21) Appl. No.: 12/550,301

(22) Filed: Aug. 28, 2009

(65) Prior Publication Data

US 2010/0220650 A1    Sep. 2, 2010

(30) Foreign Application Priority Data

Sep. 3, 2008 (GB) .................................. 0816054.1

(51) Int. Cl.
*H04L 12/56* (2006.01)
(52) U.S. Cl. .......................... 370/471; 370/528
(58) Field of Classification Search ................ 370/352, 370/468, 474, 477, 521, 471, 528
See application file for complete search history.

(56) References Cited

U.S. PATENT DOCUMENTS

2005/0094665 A1* 5/2005 Nalawadi et al. ............. 370/468
2008/0095191 A1* 4/2008 Knapp et al. ................. 370/470

OTHER PUBLICATIONS

Bluetooth Specification, version 3.0 +HS [vols. 0-5], Apr. 2009, 1712 pp.
UMA Architecture (Stage 2) R1.0.4 (May 2, 2005) Technical Specification, 87 pp.
Hunn, N., "Bluetooth® and 802.11 coexistence," Ezurio white paper, 2006, 5 pp.

* cited by examiner

*Primary Examiner* — Melvin Marcelo
(74) *Attorney, Agent, or Firm* — Warren S. Wolfeld; Haynes Beffel & Wolfeld LLP

(57) ABSTRACT

A system for transmitting data from two or more data streams on a communication channel between two or more devices. Roughly described, the data from each data stream is transmitted on the channel in the form of data packets, at least one data packet of one or more of the data streams being transmitted in between the data packets of the other data streams. The system is characterized in that the system comprises means to generate or process data packets for at least one of the data streams for transmission, the generated or processed data packets having a size below a certain value. Collisions between data packets of different data streams are thereby reduced.

18 Claims, 3 Drawing Sheets

COEXISTENCE OF DATA STREAMS

BACKGROUND

The present invention relates to systems and methods for transmitting multiple data streams over a channel.

In systems in which data is communicated between devices, two or more separate data streams may be communicated over the same communication channel using techniques such as time division multiplexing in which data packets from the different streams are transmitted at different times on the same channel. For example, the data packets of each data stream may be transmitted alternately with the data packets of one data stream being transmitted in the gaps between the data packets of the other data streams.

For example, coexistence between a synchronous data stream and an isochronous data stream on a channel involves fitting the isochronous traffic within the gaps in the synchronous traffic. A synchronous data stream is one in which the data packets are output at fixed regular intervals whereas an isochronous data stream is one where the packets are output at intervals such that a fixed time-averaged throughput is achieved. The difference between these types of data stream is essentially one of jitter. One example of a synchronous data stream is a Bluetooth SCO (Synchronous Connection Oriented) stream and one example of an isochronous data stream is an IEEE 802.11 VoIP (Voice over Internet Protocol) stream.

For a Bluetooth HV3 (High Quality Voice 3) SCO link there is only a 2.5 ms (millisecond) gap between data packets. This gap may be too small to transmit data packets of the VoIP stream without a high probability of collision between data packets of the two streams. For example, in an 802.11 VoIP link using G.711 over IP/UDP/RTP (Internet Protocol/User Datagram Protocol/Real-time Transport Protocol), the transmission of a voice packet and its acknowledgement takes at least 2.1 ms at a rate of 1 Mbps (megabits per second). This results in a 90% chance of collision with a Bluetooth HV3 SCO link.

Some existing systems address this problem using various signalling techniques. However, these techniques can significantly increase complexity of data transmission.

SUMMARY

Embodiments of the present invention solve the problems mentioned above.

According to a first aspect of the present invention, roughly described, there is provided a system for transmitting data from two or more data streams on a communication channel between two or more devices, the data from each data stream being transmitted on the channel in the form of data packets, at least one data packet of one or more of the data streams being transmitted in between the data packets of the other data streams; characterised in that the system comprises means to generate or process data packets for at least one of the data streams for transmission, the generated or processed data packets having a size below a certain value, thereby reducing collisions between data packets of different data streams.

According to a second aspect of the present invention, roughly described, there is provided a method for transmitting data from two or more data streams on a communication channel between two or more devices, the data from each data stream being transmitted on the channel in the form of data packets, the method comprising the step of: transmitting at least one data packet of one or more of the data streams in between the data packets of the other data streams; characterised in that the method comprises the further step of generating or processing data packets for at least one of the data streams for transmission, the generated or processed data packets having a size below a certain value, thereby reducing collisions between data packets of different data streams.

Embodiments of the present invention allow interference between two or more data streams on the same channel to be minimised, thereby improving the quality of the link.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
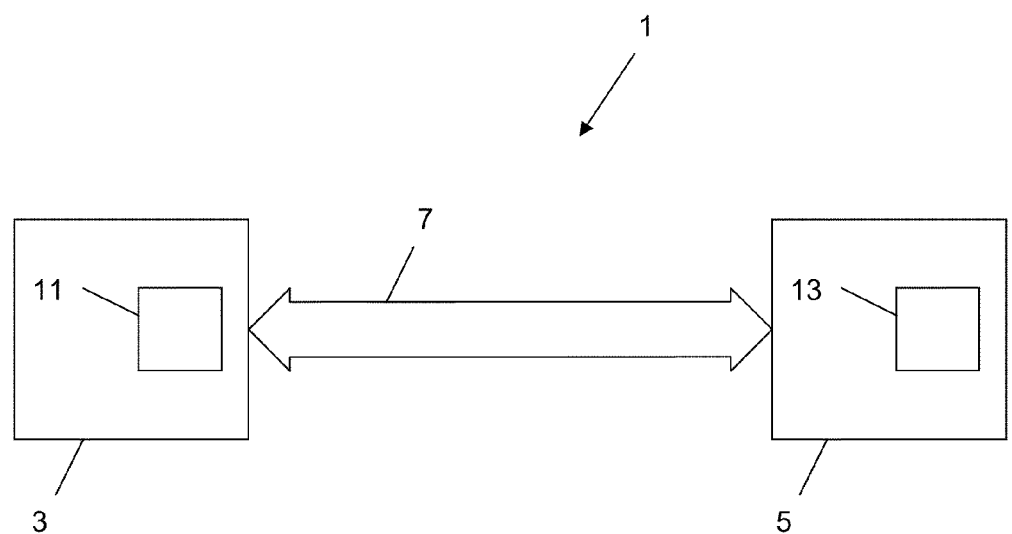
FIG. 1 is a schematic diagram of a system embodying the invention.

The system illustrated in FIG. 1 comprises a first device 3 and a second device 5 which communicate via a channel 7. The channel 7 may be any suitable type of communication channel including wired and wireless channels, and the first device 3 and second device 5 may be any suitable device capable of communicating over the channel 7. In the embodiment described below, a synchronous Bluetooth HV3 (High Quality Voice 3) SCO data stream and an isochronous VoIP data stream are transmitted over channel 7 which in this embodiment is a radio link. The data packets of the Bluetooth data stream are transmitted over the channel 7 at regular time intervals such that gaps exist between successive data packets. The VoIP data packets are transmitted on the channel 7 in between the Bluetooth data packets.

Figure 2:
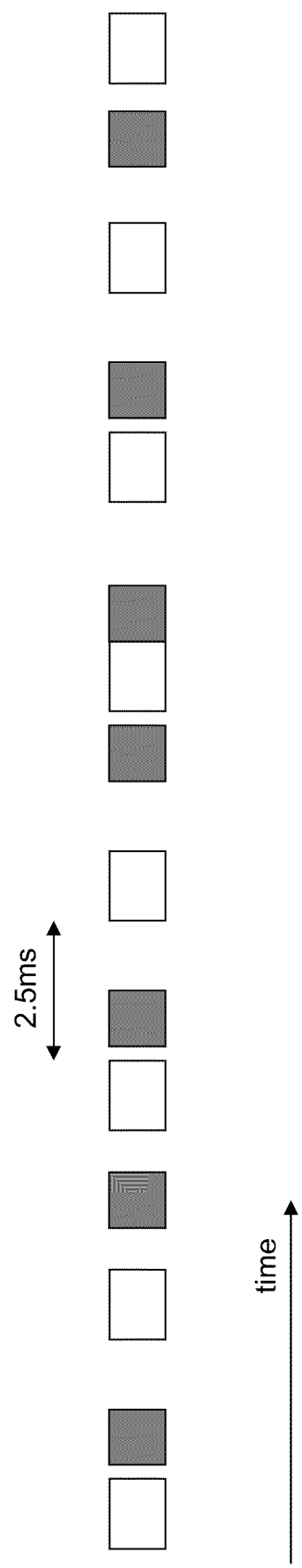
FIG. 2 is a schematic diagram showing the transmission of data packets from two different data streams on the same channel.

FIG. 2 is a schematic diagram showing the transmission of data packets from these two data streams on the channel 7. The data packets of the synchronous Bluetooth data stream are shown as white blocks while the data packets of the isochronous VoIP data stream are shown as grey blocks. Since the data packets of the synchronous data stream are transmitted at regular intervals, the white blocks in FIG. 2 representing these data packets are regularly spaced with equal sized gaps in between them. The grey blocks representing the isochronous data packets are located in between the white blocks, but are not equally spaced since isochronous data packets are not transmitted at regular time intervals. However, as mentioned above, the isochronous data packets are transmitted such that a fixed time-averaged throughput is achieved.

As described above and illustrated in FIG. 2, the gap between the Bluetooth data packets is 2.5 ms. It is important that the size of the VoIP data packets is sufficiently small so that they can be transmitted between the Bluetooth packets with a low probability of the VoIP packets colliding with the Bluetooth packets.

In order to achieve this, the VoIP data packets may be generated or processed to be smaller in size than normal VoIP packets, before being transmitted. The resulting reduced-size data packets occupy a smaller time period on the channel 7 so that the chance of collision is reduced. This may be performed using any suitable technique, several examples of which are described below. The first device 3 comprises means 11 to generate or process data packets to have a size smaller than a certain selected, determined or specified value. In general, the specified size is chosen or determined so as to reduce or minimise collisions between the reduced-size data packets and the data packets of the other data streams. The certain size may be predetermined or selected, specified or determined dynamically depending on various factors such as the size of the time gap between data packets in which the data packet is to be transmitted. For example, the data packets may be generated or processed to be smaller in size than the normal size of equivalent data packets.

For example, using one technique, the header portion of the data packet may be compressed using any suitable technique, such as RoHC (robust header compression). In streaming applications, the header of a data packet can represent a significant overhead. For example, the IP header of a data packet comprises 20 octets in IPv4 or 40 octets in IPv6. In VoIP applications, this can account for up to 60% of the total data in the packet. Using RoHC, the IP header can be compressed to a few octets, resulting in a significant reduction in the size of the header, thus reducing the overall size of the packet.

Using other techniques, the header portion of a data packet may be modified in ways other than standard compression to reduce the size of the header. Some examples are described below. In order to better understand these examples, the features of a typical data transmission system will first be described.

In a typical network of two or more devices, data is transmitted between nodes of the network using a layered framework model, such as the seven-layered OSI (Open System Interconnection) model. At each node, control of the data is passed from one layer to the next, each layer performing various services and tasks including processing the data and adding or removing any additional information (in the form of headers) necessary to implement one or more communication protocols. At the transmitting node, control is passed from the top layer, through each layer, to the bottom layer, where it is transmitted to the receiving node over a channel. At the receiving node, control of the data passes from the bottom layer, through each layer, to the top layer. Other network models are known to those skilled in the art, including ones with fewer layers.

Some of the layers of the OSI model will now be briefly described. The bottom (first) layer is called the Physical Layer and provides the hardware to transmit and receive data at the physical level (for example in the form of electrical, light or radio signals). The second layer is called the Data Link Layer and handles encoding and decoding the data into logical bits. This layer is divided into two sub-layers called the MAC (Medium Access Control) sub-layer, which controls access to the data, and the LLC (Logical Link Control) sub-layer, which controls tasks such as frame synchronisation, flow control and error checking. The third layer is called the Network Layer and handles routing and addressing of data, for transmitting data between nodes. The fourth layer is called the Transport Layer and is responsible for flow control and end-to-end error recovery. The top (seventh) layer is called the Application Layer is handles application level data. The fifth and sixth layers are not described here.

As mentioned above, data may be modified or processed at various layer of the framework to implement one or more protocols for transmitting the data between nodes. Examples of protocols associated with various layers will now be described.

The Internet Protocol (IP) is a Network Layer ($3^{rd}$ Layer) protocol that includes addressing information and some control information that enables data packets to be routed. Two examples of the IP are IPv4 and IPv6 (versions 4 and 6). Data transmitted according to the IP is in the form of a data packet, or datagram, comprising payload data and an IP header. An IP header includes various fields including network source and destination address fields. When a data packet is to be transmitted by a node, the packet is processed in the Network Layer to append the IP header before being passed to the next lowest layer for subsequent processing. When a data packet is received by a node, the IP header is removed in the Network Layer before the packet is passed to the next highest layer.

The Transmission Control Protocol (TCP) is a Transport Layer ($4^{th}$ Layer) protocol providing reliable transmission of data between nodes. Using the TCP, data packets are sequenced so that data packets arriving at the destination node out of order can be re-ordered. The TCP also provides for an acknowledgement mechanism in which receipt of data packets by the destination node are acknowledged. If an acknowledgement for a specific data packet is not received by the source node within a certain time then the packet is re-transmitted. Data packets transmitted according to the TCP comprise a TCP header having various fields, including a sequence number field and acknowledgement number field. When a data packet is to be transmitted, it is processed in the Transport Layer to append the TCP header before being passed to the next lowest layer. When a data packet is received, the TCP header is removed in the Transport Layer before the packet is passed to the next highest layer.

The Logical Link Control (LLC) Protocol is a Data Link Layer ($2^{nd}$ Layer) protocol and provides a link mechanism to upper layer protocols. An LLC header comprises three fields, including one defining a Service Access Point (SAP) destination address and another defining a SAP source address. A SAP is a number which identifies the class of data comprised in the packet and allows the data to be passed to the appropriate service within the layered framework for processing. An extension of the LLC protocol is the SubNetwork Access Protocol (SNAP). Using SNAP, the LLC header of 3 octets is augmented to include an addition 5 octet SNAP header (IEEE 802-2001 protocol identifier) which follows the LLC header. In this case, the 3 octet LLC header includes information identifying that the SNAP protocol is being used and the 5 octet SNAP header portion includes information identifying the type of data comprised in the data packet.

Other protocols known to those skilled in the art include: the User Datagram Protocol (UDP), which is a Transport Layer protocol and acts as an interface between the IP layer and upper layer processes; and the Real-time Transport Protocol (RTP) which defines a standardised packet format for delivering audio and video data. The RTP protocol includes RTP sequence numbers allowing data packets to be properly sequenced.

As described above, during the process of transmitting data between nodes, various headers may be appended to the data depending on which transmission protocols are being applied. Other techniques to reduce the size of a data packet header portion involve modifying or eliminating one or more of the various headers in order to reduce the overall size of the data packet.

For example, in cases where SNAP is employed, instead of sending the full 8 octet header, comprising a 3 octet LLC header and 5 octet SNAP header, only the 3 octet LLC header is used. The SAP address specified in the LLC header may be set to the value 0x06 specifying IP as the SAP. In this example, the system can assume that all data packets transmitted under this scheme will contain VoIP data and so it is not necessary to include the 5 octet SNAP header which indicates the type of data comprised in each data packet.

Alternatively, neither the LLC nor the SNAP header is used for IP traffic. In this case, if the first octet is 0x4x, this denotes that IPv4 is being used. If the first octet is 0x6x, this denotes that IPv6 is being used. If the first octet is any other value, this denotes that LLC/SNAP are being used.

A further technique involves defining a new SAP address which is then used for all VoIP packets transmitted over the channel 7, with no IP, UDP, RTP or other headers being applied. In this case, any or all of the headers could be implied, either partially or completely. However, a negotiation protocol would be necessary to establish the implied IP, UDP, RTP or other fields.

In general, when one or more headers are eliminated from data packets the information that would have been contained in those headers can be agreed in advance of transmission between two or more communicating devices using the negotiation protocol. For example, using the negotiation protocol, any devices can agree in advance that all data packets transmitted using the methods described above will be transmitted according to a certain set of protocols and/or parameters. Some of these parameters are those that would have been specified in one or more of the eliminated headers. Since these parameters and any necessary protocols are agreed in advance, it is no longer necessary to transmit the headers with the data packets as the information contained in them would be redundant.

It may not be possible in some cases to eliminate all header information. For example, when using the RTP protocol and proper sequencing of data packets is required, it would be necessary to retain the RTP sequence numbers of data packets. For example, either the header containing the RTP sequence numbers would need to be retained, or the sequence numbers would need to be retained elsewhere, such as within a reduced-size header or within the body portion of the data packet.

In order to receive and process the data packets generated or processed according to the techniques described above, the second device 5 comprises means 13 to process the received data packets, for example to decompress the header portion of the data packet, or recover information in headers that were eliminated or implied in the transmitted data packet.

Figure 3:
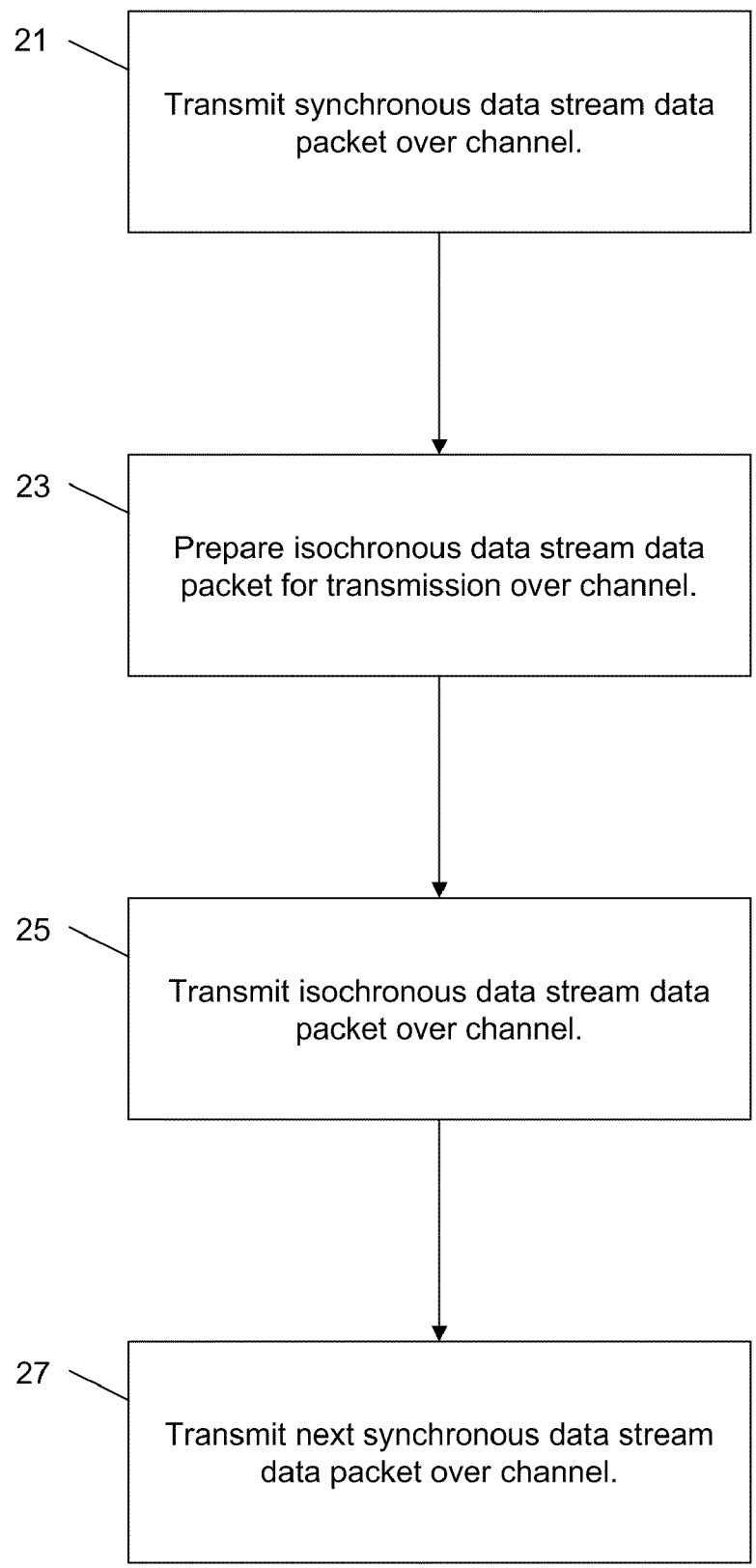
FIG. 3 is a flow diagram of a method embodying the invention.

FIG. 3 is a flow diagram of an exemplary method embodying the invention. In a first step 21, the first device 3 prepares and transmits a Bluetooth HV3 SCO data packet on channel 7 to the second device 5. In a next step 23 the first device 3 generates an 802.11 VoIP data packet for transmission over the channel 7. In this step, the data packet is generated or processed to have a size smaller than the normal size of a VoIP data packet. This step may involve one or more of the techniques described above, such as performing header compression and/or modifying or eliminating one or more of the headers in the header portion of the packet. In a next step 25, the VoIP data packet is transmitted over the channel 7. In a next step 27, the next Bluetooth HV3 SCO data packet is transmitted over the channel 7. Using the techniques described above, the chances of a collision between this Bluetooth packet and the previously transmitted VoIP packet is significantly reduced.

The above techniques may be applied on an end-to-end basis, or may be applied on only a part of a communications network, such as between specific nodes of the network. For example, in some embodiments the conversion may be performed in the penultimate node, such as the access point in 802.11 applications. The techniques described may then be applied in the final hop, which in 802.11 applications is the wireless medium.

An additional advantage gained using the techniques described above is that less bandwidth is used to transmit the data.

The techniques described above can be applied to any suitable type and combination of data streams. This includes any number of synchronous or isochronous streams (including but not limited to VoIP) with any number of synchronous or isochronous interfering streams (including but not limited to Bluetooth or HV3 SCO). The techniques may also be applied to any suitable type of medium and is not limited to wireless transmission. When two or more streams are transmitted on the same channel, the data packets of one or more of the data streams may be compressed to avoid collision between the data packets of other data streams. For example, in one embodiment, there can be data packets from multiple isochronous data streams transmitted between data packets of a synchronous data stream.

Although in some of the embodiments described above the data packets of the isochronous VoIP stream are compressed to reduce the size of the data packets, the invention is not limited to this specific example. In the embodiments described above it is the data packet headers that are compressed to reduce the size of the data packets. However, in other embodiments, the data packet payload data, or both the header and the payload data may be compressed to reduce the size of the data packets. The size of data packets may be reduced by any suitable alternative means, such as by dividing a data packet up into two or more data packets of smaller size.

What is claimed is:
1. A system for transmitting data from two or more data streams on a communication channel between two or more devices, comprising:
   a transmitter transmitting on the channel data from a first one of the data streams in the form of data packets,
   the transmitter further transmitting on the channel at least one data packet of a second one of the data streams in between data packets of the first data stream,
   wherein the transmitter includes a data packet generator which generates the at least one data packet of the second data stream in such a manner as to be of a size smaller than a normal size of equivalent data packets and such that the generated data packets have a size below a certain value, thereby reducing collisions between data packets of different data streams.

2. A system according to claim 1 in which at least one of the data streams is a synchronous data stream.

3. A system according to claim 2 in which at least one of the synchronous data stream is a synchronous Bluetooth data stream.

4. A system according to claim 1 in which at least one of the data streams is an isochronous data stream.

5. A system according to claim 4 in which at least one of the isochronous data stream is a VoIP data stream.

6. A system according to claim 1 in which the data packet generator includes a compressor which compresses a header portion of the data packets of the second data stream.

7. A system according to claim 6 in which the header portion is compressed using IETF RoHC.

8. A system according to claim 1 in which the data packets of the second stream comprise a header portion including one or more headers, and in which the data packet generator is generates data packets for the second data stream with one or more of the headers eliminated.

9. A system according to claim 8 in which the header portion comprises an LLC header, and in which the data packet generator eliminates a SNAP header (IEEE 802-2001 protocol identifier).

10. A system according to claim 8 in which the data packet generator eliminate an LLC header.

11. A system according to claim 8 in which the data packet generator eliminates all headers from the data packet.

12. A system according to claim 1 in which the transmitter further establishes a negotiation protocol between the two or more devices.

13. A system according to claim 1 in which the data packet generator compresses payload data of the data packets of the second data stream.

14. A system according to claim 1 in which the data packet generator divides up the data packets of the second data streams.

15. A system according to claim 1 in which the devices form part of a communications network, and in which the generated or processed data packets are transmitted on only part of the communications network.

16. A system according to claim 15 in which the generated or processed data packets are transmitted on a wireless part of the communications network.

17. A method for transmitting data from two or more data streams on a communication channel between two or more devices, the data from each data stream being transmitted on the channel in the form of data packets, the method comprising the step of: transmitting at least one data packet of one or more of the data streams in between the data packets of the other data streams; characterized in that the method comprises the further step of generating or processing data packets for at least one of the data streams for transmission, the further step comprising generating or processing data packets for said at least one of the data streams that are smaller in size than a normal size of equivalent data packets such that the generated or processed data packets have a size below a certain value, thereby reducing collisions between data packets of different data streams.

18. A system for transmitting data from two or more data streams on a communication channel between two or more devices, comprising:
- a transmitter transmitting data on the channel from a first one of the data streams in the form of data packets,
- the transmitter further transmitting on the channel at least one data packet of a second one of the data streams in between data packets of the first data stream,
- wherein the transmitter includes a data packet generator which generates the at least one data packet of the second data stream in such a manner as to be of a size smaller than a normal size of equivalent data packets and such that the generated data packets have a size below a certain value, thereby reducing collisions between data packets of different data streams,
- and wherein the system further establishes a negotiation protocol between the two or more devices.

* * * * *

UNITED STATES PATENT AND TRADEMARK OFFICE
CERTIFICATE OF CORRECTION

| | | |
|---|---|---|
| PATENT NO. | : 8,238,369 B2 | |
| APPLICATION NO. | : 12/550301 | |
| DATED | : August 7, 2012 | |
| INVENTOR(S) | : Rison | |

It is certified that error appears in the above-identified patent and that said Letters Patent is hereby corrected as shown below:

In Column 7, Line 8, in Claim 8, delete "generator is" and insert -- generator --, therefor.

In Column 7, Line 15, in Claim 10, delete "eliminate" and insert -- eliminates --, therefor.

In Column 7, Line 27, in Claim 14, delete "streams." and insert -- stream. --, therefor.

Signed and Sealed this
Ninth Day of October, 2012

David J. Kappos
*Director of the United States Patent and Trademark Office*